United States Patent [19]

Laliwala

[11] 4,305,737
[45] Dec. 15, 1981

[54] HORIZONTAL VENTURI SCRUBBER

[75] Inventor: Jitendra R. Laliwala, Ronkonkoma, N.Y.

[73] Assignee: The Ducon Company, Mineola, N.Y.

[21] Appl. No.: 859,341

[22] Filed: Dec. 12, 1977

[51] Int. Cl.³ .................. B01D 47/02; B01D 47/10
[52] U.S. Cl. .................. 55/226; 261/DIG. 54; 261/DIG. 56; 55/229; 55/259
[58] Field of Search ............... 55/226, 227, 229, 259; 261/DIG. 54, DIG. 56, 118

[56] References Cited

U.S. PATENT DOCUMENTS

| | | | |
|---|---|---|---|
| 2,337,983 | 12/1943 | Fisher | 261/DIG. 54 |
| 2,751,974 | 6/1956 | Stadler | 261/DIG. 54 |
| 2,873,816 | 2/1959 | Umbricht et al. | 261/DIG. 54 |
| 3,336,013 | 8/1967 | Salo | 261/DIG. 54 |
| 3,367,402 | 2/1968 | Cross, Jr. et al. | 261/DIG. 54 |
| 3,581,474 | 6/1971 | Kent | 55/226 |
| 3,685,261 | 8/1972 | McIlvaine et al. | 261/DIG. 54 |
| 3,798,880 | 3/1974 | Arnold et al. | 261/DIG. 54 |
| 3,815,332 | 6/1974 | Bobrowsky et al. | 261/DIG. 54 |
| 3,834,129 | 9/1974 | Darlinger et al. | 261/DIG. 54 |
| 3,853,484 | 12/1974 | Sudar et al. | 261/DIG. 54 |
| 3,856,487 | 12/1974 | Perez | 261/DIG. 54 |
| 3,888,955 | 6/1975 | Marvko | 261/DIG. 54 |
| 4,012,469 | 3/1977 | Accortt | 261/DIG. 54 |

FOREIGN PATENT DOCUMENTS

| | | | |
|---|---|---|---|
| 764429 | 12/1956 | United Kingdom | 261/DIG. 54 |
| 1010415 | 11/1965 | United Kingdom | 261/DIG. 54 |

Primary Examiner—Gregory N. Clements
Attorney, Agent, or Firm—Seidel, Gonda, Goldhammer & Panitch

[57] ABSTRACT

A horizontally disposed scrubber is provided with a generally horizontally disposed adjustable venturi having a slot-type liquid introduction through which a liquid is introduced into a particle laden gas stream.

8 Claims, 3 Drawing Figures

HORIZONTAL VENTURI SCRUBBER

SUMMARY OF THE INVENTION

The present invention is directed to apparatus which includes a horizontally disposed scrubber vessel having an inlet in an end wall thereof for receiving a particle laden gas stream and scrubbing liquid moving in a horizontal direction. The vessel has an outlet adjacent an opposite end thereof. A horizontally disposed wall in said housing divides the housing into a liquid supply tank below the wall and a separator chamber above the wall. One or more mist separators are provided in said separator chamber above said wall and through which said stream must pass in its travel from said inlet to said outlet.

A generally horizontally disposed venturi housing has its outlet connected to the inlet on said vessel. A movable member in said housing cooperates with an anvil to define a venturi throat. An actuator is connected to said member and extends externally of said housing to facilitate adjusting the area of said throat. A horizontally disposed liquid inlet slot is provided upstream from said movable member. The venturi housing is preferably provided with a chamber for feeding liquid to said slot. A pump is connected to said chamber and to said liquid supply tank for pumping liquid from said tank to said slot. The venturi housing is preferably provided with a refractory lining when used with high temperature gases or abrasive dust particles.

It is an object of the present invention to provide a horizontal venturi scrubber having novel structural interrelationships and having advantages as will be set forth hereinafter.

For the purpose of illustrating the invention, there is shown in the drawings a form which is presently preferred; it being understood, however, that this invention is not limited to the precise arrangements and instrumentalities shown.

Referring to the drawings in detail, wherein like numerals indicate like elements, there is shown apparatus in accordance with the present invention designated generally as 10.

Figure 1:
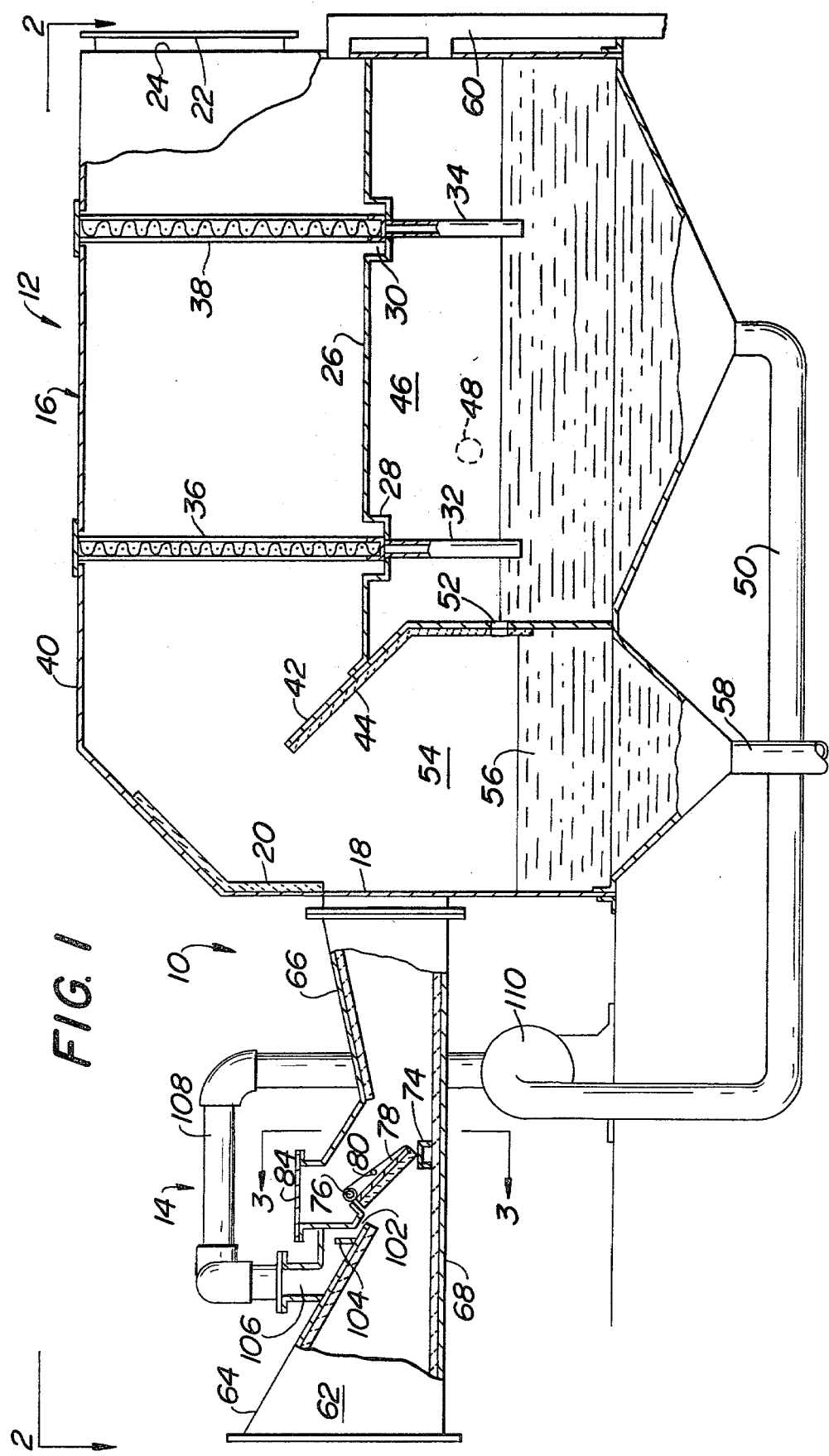
FIG. 1 is a vertical sectional view of apparatus in accordance with the present invention.
Figure 2:
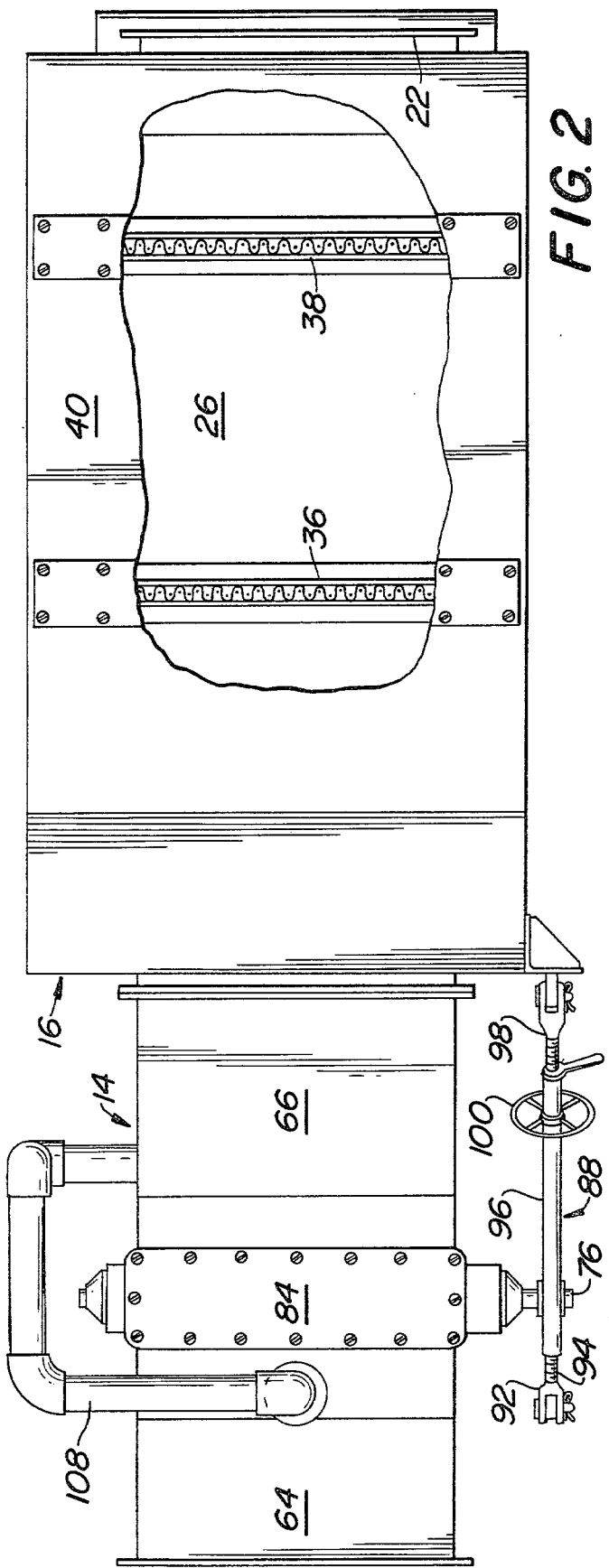
FIG. 2 is a top plan view of the apparatus shown in FIG. 1 with portions broken away for purposes of illustration.

The apparatus 10 includes a horizontally disposed scrubber 12 having a generally horizontally disposed venturi 14. The scrubber 12 includes a generally rectangular horizontally disposed vessel 16 having an inlet 18 in vertically disposed end wall 20. An opposite end wall 24 is provided with an outlet 22.

The vessel 16 is provided with a generally horizontally disposed divider wall 26 having channels 28 and 30 on its upper surface. Channel 28 is provided with a downwardly extending dip leg 32. Channel 30 is provided with a downwardly extending dip leg 34. A vertically disposed moisture eliminator 36 is disposed within channel 28 and extends to the top wall 40 of the vessel 16. A moisture eliminator 38 is provided in channel 30 and extends to the top wall 40.

The moisture eliminators 36 and 38 are identical except that eliminator 36 is designed for the removal of large liquid droplets and can remove large percentages of liquid-carryover. The moisture eliminator 38 is similar but is designed for high efficiency for smaller liquid droplets. The difference between the moisture eliminators is the size and spacing of the moisture eliminator elements and per se are well known to those skilled in the art. Top wall 40 is provided with a slot through which the moisture eliminators are inserted and/or removed.

The divider wall 26 is provided with a baffle 42 having a refractory lining 44 on the surface thereof remote from the moisture eliminator 36. The baffle 44 cooperates with the divider wall 26 and end wall 24 to define a liquid collection chamber 46 which contains the dip legs 32, 34. Chamber 46 is provided with a valved inlet 48 for selectively introducing fresh water in chamber 46.

Between the inlet 18 and the baffle 42, there is provided an inlet chamber 54 containing a body of a liquid which has been rendered dirty due to contact with a particle laden gas stream. The baffle 42 is provided with a flow port 52 so that liquid from chamber 46 may overflow into chamber 54. Chamber 54 is provided with an outlet conduit 58. Outlet conduit 58 is connected to a drain and is provided with a selectively operable valve not shown. An overflow conduit 60 communicates with chamber 46 and with the chamber above divider wall 26 downstream from the moisture eliminator 38.

The venturi 14 includes a housing designated generally as 62. The housing 62 has a converging inlet portion 64 and a diverging outlet portion 66. The outlet portion 66 communicates with the inlet 18 of the vessel 16. Housing 62 is defined by a generally horizontally disposed bottom wall 68 and vertically disposed side walls 70, 72. See FIGS. 1 and 3. The walls of the housing 62 are preferably lined with a refractory when used with high temperature gases or abrasive dust.

Figure 3:
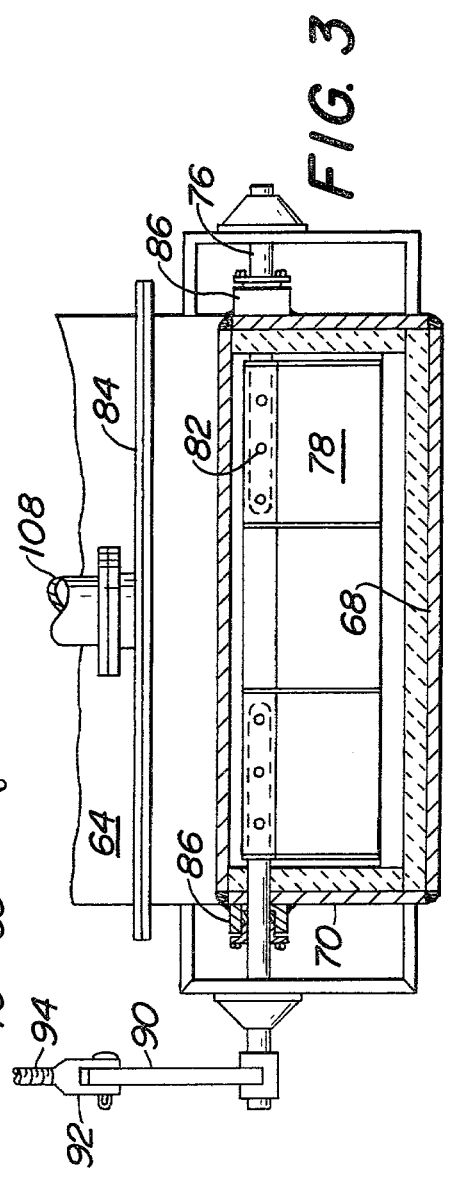
FIG. 3 is a sectional view taken along the line 3—3 in FIG. 1.

The refractory on the upper surface of the bottom wall 68 is preferably interrupted and at such location receives a transversely disposed metal anvil 74. A shaft 76 extends transversely across the housing 62 and is supported by the bearings 86 on the side walls 70, 72. A plate-like member 78 is removably coupled to shaft 72 by a plurality of bolts 82. Member 78 on its uppermost surfae as shown in FIGS. 1 and 3 is provided with lifting holes 80.

The housing 62 is provided with a access opening on a top wall thereof. The access opening is closed by a removable door 84. Door 84 faciliates removal of the member 78. Member 78 is provided with an actuator externally of the housing 62 and designated generally as 88. The actuator 88 includes a link 90 connected to an end of the shaft 76 externally of housing 62.

The link 90 lies in a plane corresponding generally to the plane of the member 78 and extends in an opposite direction from the shaft 76. Thus, when member 78 is horizontally disposed and extending to one side of the shaft 76, link 90 is likewise horizontally disposed and extending to an opposite side of the shaft 76. One end of the link 90 is fixedly secured to shaft 76 and rotates therewith.

The other end of link 90 is pivotably connected to a clevis 92 on one end of a turnbuckle comprised of members 94, 96 and 98. The end of member 94 remote from the clevis 92 is threadedly coupled to and telescoping into member 96. One end of member 98 is threadedly coupled to and extends into member 96. The other end of member 98 is provided with a clevis pivotably connected to the vessel 16. Thus, member 96 is hollow and is provided with a radially outwardly extending handle 100 preferably in the form of a wheel. For automatic control of the pressure drop, a pneumatic, hydraulic or electrical actuator can be provided instead of turnbuckle type device.

Referring to FIG. 1, the housing 62 is provided with a liquid distribution chamber 106. Chamber 106 is provided with an overflow weir 104 overwhich liquid may flow and then enter the interior of the housing 62, upstream from the member 78, by way of a transversely disposed horizontal slot 102 having a length corresponding to the length of member 78. The slot 102 is dimensioned to create enough back pressure in chamber 106 whereby it acts as an elongated nozzle for spraying the liquid evenly through the entire length of the member 78.

Liquid is supplied to the chamber 106 by way of conduit 108. Conduit 108 is connected to the outlet side of pump 110. The inlet side of pump 110 is connected to the chamber 46 by way of conduit 50.

The apparatus of the present invention is particularly adapted for use in the field of emission control for coke ovens in the steel industry. Coal is converted to coke by burning the impurities in a controlled atmosphere. When the coke is ready in a particular oven, it is pushed out into a railroad car especially designed to handle hot burning coke. This operation emits significant amounts of dust in the atmosphere. Also, there is a problem while transferring coke from the ovens.

The present invention is readily adaptable for mounting on the railroad car containing the hot burning coke. A horizontal exhaust duct from the railroad car connects to the inlet of venturi 14. Problems in designing the apparatus of the present invention included the ability to handle large effluent gas volumes at high temperature, limited spaced availability, height and width limitations for shipping and operating, fresh and dirty water reservoirs, etc.

Thus, the apparatus of the present invention is adapted to control the particulate emitted during the "push cycle" of the coking process and was designed to fit into a limited space on a railroad car. The apparatus of the present invention is completely portable and self-contained except for make-up water supply and dirty water discharge drain.

The hot particle laden gases discharge at high velocity into the converging portion 64 of the venturi 14. The adjustable venturi throat causes atomization of the scrubbing liquid discharged through slot 102 and discharges the clean gas and slurry (agglomerated liquid and suspended particulate) through the diverging portion 64 into chamber 54.

The slurry collects in chamber 54 and is designated by the numeral 56. The cleaned gas and any liquid entrainment is forced by baffle 42 to make two 90° turns before reaching the moisture eliminator 36 where large liquid particles are removed and transmitted by way of dip leg 32 to chamber 46. Smaller liquid particles are removed by moisture eliminator 38 and transmitted to chamber 46 by way of dip leg 34. The 90° turns help to distribute the gas evenly to the moisture eliminators.

The clean desaturated gas is directed from outlet 22 to the atmosphere. The liquid such as water introduced into the gas stream by way of slot 102 is pumped from chamber 46 to chamber 106 by way of pump 110. At the end of a cycle, the valve in conduit 58 is open and slurry 56 discharges through a drain.

The apparatus of the present invention has a number of advantages and features which make it unique. The venturi 14 and the scrubber 12 are each horizontally disposed. Scrubbing liquid is introduced to the venturi throat by way of a horizontally disposed slot 102. The concept of a horizontal approach offers the benefit of adapting to any kind of control hood assembly on a coke quenching car enclosure. Duct work is minimized and a compact design is achieved with considerable cost savings for the designed capacity. Chamber 54 and baffle 42 prevent any abrasive dust from impacting on the moisture eliminator 36.

The horizontally disposed scrubber 12 and venturi 14 can be readily fitted onto a railroad car and made completely self-contained. The use of a single slot for liquid introduction provides for even distribution of liquid across the venturi throat. The single horizontally adjustable venturi blade is readily removable through the opening after removal of door 84 for servicing if required. The moisture eliminators are readily accessible from outside the scrubber 12.

The present invention may be embodied in other specific forms without departing from the spirit or essential attributes thereof and, accordingly, reference should be made to the appended claims, rather than to the foregoing specification as indicating the scope of the invention.

It is claimed:

1. Apparatus comprising a horizontally disposed scrubber vessel, said vessel having an inlet at one end and an outlet at an opposite end, a horizontally disposed wall in said vessel, a liquid tank below said wall in said vessel, said wall supporting at least one upright moisture eliminator above said wall and through which a horizontally disposed gas stream above said wall must pass when flowing from said inlet to said outlet, a venturi housing having its outlet connected to said vessel inlet, said venturi inlet and outlet being at approximately the same elevation so that flow through said venturi housing is generally horizontal, an anvil, a movable member in said housing and cooperating with said anvil to define a venturi throat, said member being pivotably supported by said housing for movement about a horizontally disposed axis transverse of said housing, an actuator externally of said housing and connected to said member for moving said member to adjust the area of the venturi throat defined by the space between said anvil and said member, means defining a horizontally disposed water inlet slot in said venturi housing upstream from and adjacent to said member, said venturi housing having a chamber for feeding a liquid to said slot, a pump connected to said chamber and to said tank for pumping an aqueous liquid from said tank to said chamber, and said vessel having a chamber upstream of said wall and below the elevation of said moisture eliminator for collecting liquid introduced into said venturi housing through said slot and which enters said vessel through said vessel inlet.

2. Apparatus in accordance with claim 1 including a refractory lining on the upstream side of said member and on the interior of said venturi housing.

3. Apparatus in accordance with claim 2 including refractory lining on an upright wall within said vessel opposite the inlet thereof, said upright wall defining a part of said vessel chamber.

4. Apparatus in accordance with claim 1 wherein said venturi housing has a flat bottom wall which is horizontally disposed.

5. Apparatus in accordance with claim 1 wherein said venturi housing is provided with an access door above said movable member to facilitate removal of said member.

6. Apparatus in accordance with claim 1 wherein said venturi housing chamber includes a weir for feeding the liquid to said slot.

7. Apparatus in accordance with claim 1 including means defining a 90° bend between said moisture eliminator and the downstream end of said venturi housing.

8. Apparatus in accordance with claim 1 wherein said actuator includes a shaft and a turnbuckle connected to said shaft by way of a link, one end of said link being fixedly secured to said shaft, the other end of said link being pivotably connected to one of the elements comprising the turnbuckle.

* * * * *